(12) United States Patent
Wang et al.

(10) Patent No.: US 7,738,547 B2
(45) Date of Patent: *Jun. 15, 2010

(54) METHOD AND APPARATUS FOR IMPROVED HIGH-SPEED ADAPTIVE EQUALIZATION

(75) Inventors: John S. Wang, Sunnyvale, CA (US);
Sudeep Bhoja, San Jose, CA (US);
Shanthi Pavan, Fremont, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/943,569

(22) Filed: Nov. 20, 2007

(65) Prior Publication Data

US 2008/0260015 A1    Oct. 23, 2008

Related U.S. Application Data

(63) Continuation of application No. 09/955,278, filed on Sep. 11, 2001, now Pat. No. 7,301,997.

(51) Int. Cl.
*H03H 7/30* (2006.01)

(52) U.S. Cl. ................... 375/232; 333/18; 708/323

(58) Field of Classification Search .............. 375/232, 375/317, 319, 371, 341, 345, 376, 229, 230, 375/219, 231, 234, 233, 224; 333/18; 708/323
See application file for complete search history.

(56) References Cited

U.S. PATENT DOCUMENTS

| | | | | |
|---|---|---|---|---|
| 5,880,645 A | * | 3/1999 | Everitt et al. | 333/18 |
| 6,038,266 A | * | 3/2000 | Lee et al. | 375/317 |
| 6,967,988 B1 | * | 11/2005 | Wedding | 375/142 |
| 7,301,997 B1 | * | 11/2007 | Wang et al. | 375/232 |

* cited by examiner

*Primary Examiner*—Temesghen Ghebretinsae
(74) *Attorney, Agent, or Firm*—Klein, O'Neill & Singh, LLP (57) ABSTRACT

A method and apparatus for improved high-speed adaptive equalization that may operate effectively even in systems experiencing severe interference by using one or more error generators and taking multiple samples across a bit interval. Advantageously, a preferred embodiment of the current invention may be deployed in a clockless configuration. Preferably, one or more controllable analog filters may be controlled by one or more microprocessors used to assess the error data from the error generators and to calculate the appropriate coefficients for the filters according to one or more error minimization algorithms. Preferably, the steps of sampling, assessment, calculation and coefficient setting may be done iteratively to converge to an optimum set of filter values and/or respond dynamically to signals with time-varying noise and interference characteristics.

6 Claims, 12 Drawing Sheets

Optionally, the process begins when one or more control algorithms are activated or selected (Step 400).

Optionally, the process continues when one or more controllable analog filters are initialized (Step 410).

One or more data signal inputs are received by one or more controllable analog filters (Step 420).

One or more controllable analog filters filter one or more input data signals (Step 430).

One or more filtered data signals are carried on one or more controllable analog filter outputs (Step 440).

FIG. 7A

Preferably, one or more error generators receive filtered data signal output signals (Step 450).

Preferably, an error generator may assess the performance of one or more analog filters according to one or more error functions and generate one or more error generator output signals (Step 460).

Preferably, error generator output signals are further processed (Step 470).

Preferably, one or more equalizer controllers receives one or more processed signals (Step 480).

The equalizer controller may compute a new set of coefficients according to one or more error minimization algorithms (Step 490).

FIG. 7B

One or more equalizer controllers control the controllable analog filter by providing control signal inputs that are used to change controllable analog filter coefficients (Step 500).

Optionally, iterate one or more times by returning to Step 420 (Step 510).

FIG. 7C

The initial filter coefficients may be set to: c(1)=0, c(2)=0, c(3)=0 ... c(N-1)=0, c(N)=1.0. (Step 600).

An initial error signal may be acquired from the ADC 207 and assigned to a variable, x (Step 610).

Set variable i = 1 (Step 615).

Coefficient c(i) in the controllable analog filter may be set to c(i) + Δ where Δ is a small number.

Acquire a new error signal collected with controllable analog filter set to the new c(i) value and call this error signal value x(i) (Step 630).

Restore the value of c(i) in the controllable analog filter back to its original value (c(i) - Δ) and increment i (Step 640).

if i ≤ N if i > N go to Step 650

FIG. 8A

Compute the gradient vector (Step 650).

Perform a line search to find the value of t that minimizes the error signal for coefficient values [c(1) c(2) ... c(N)] - t * [g(1) g(2) ... g(N)] for t >=0. The notation [c(1) c(2) ... c(N)] denotes the N-dimensional vector whose i'th component is c(i) (Step 660).

Validate results and discard invalid results (Step 665).

Set the coefficients for the controllable analog filter to: [c(1) c(2) ... c(N)] = [c(1) c(2) ... c(N)] - $t_{min}$ * [g(1) g(2) ... g(N)], where tmin is the value of t determined according to the line search executed in Step 660 (Step 670).

Optionally, return to Step 610 (Step 680).

FIG. 8B

METHOD AND APPARATUS FOR IMPROVED HIGH-SPEED ADAPTIVE EQUALIZATION

CROSS-REFERENCE TO RELATED APPLICATION

The present application is a continuation application of U.S. patent application Ser. No. 09/955,278, filed Sep. 11, 2001, entitled "METHOD AND APPARATUS FOR IMPROVED HIGH-SPEED ADAPTIVE EQUALIZATION", to issue on Nov. 27, 2007 as U.S. Pat. No. 7,301,997, the disclosure of which is incorporated herein by reference.

BACKGROUND INFORMATION

1. Field of the Invention

The current invention relates to the field of signal equalization, particularly to enabling improved high-speed adaptive equalization.

2. Description of Related Art

Increased demand for high-speed communications services has required that economical and efficient new devices and techniques be developed to support performance increases. For example, as transmission rates climb to the 10-40 Gb/s range and beyond in modern optical networks, signal processing and conditioning techniques must be applied to filter out noise and reduce interference such as inter-symbol interference (ISI). Typical optical networks are plagued by noise and bandwidth limitations such as polarization mode dispersion and limited component bandwidth. Furthermore, the ISI can be time varying due to a variety of causes such as physical vibration, mechanical stresses and temperature fluctuations. Typically, optical receivers may use devices such as equalizers to improve the overall performance of such systems and minimize the error rate. However, the implementation of such devices has proven to be challenging and costly.

Figure 1:
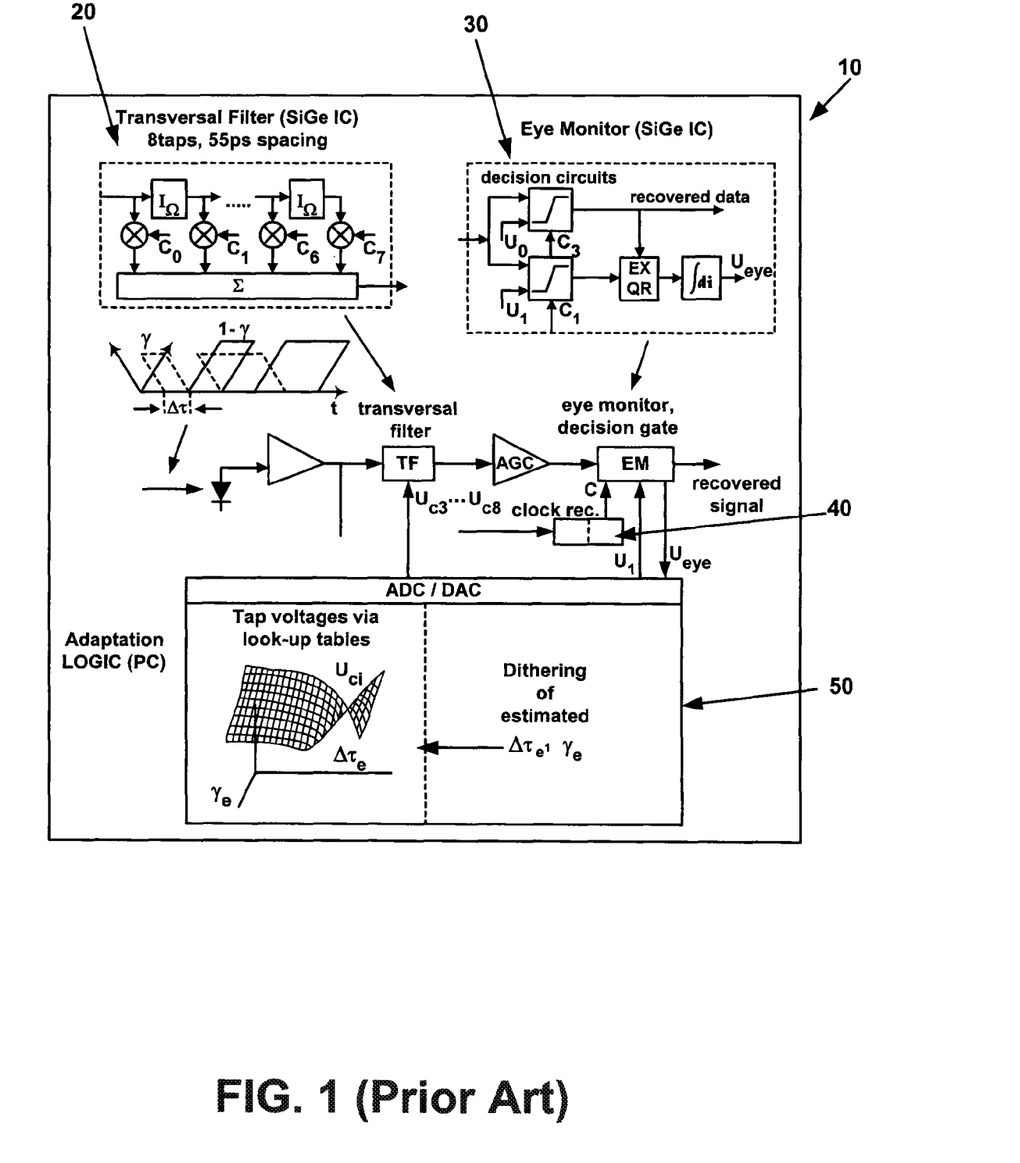
FIG. 1 (prior art) illustrates an example of a proposed transversal filter based equalizer controlled by a microprocessor.
Figure 2A:
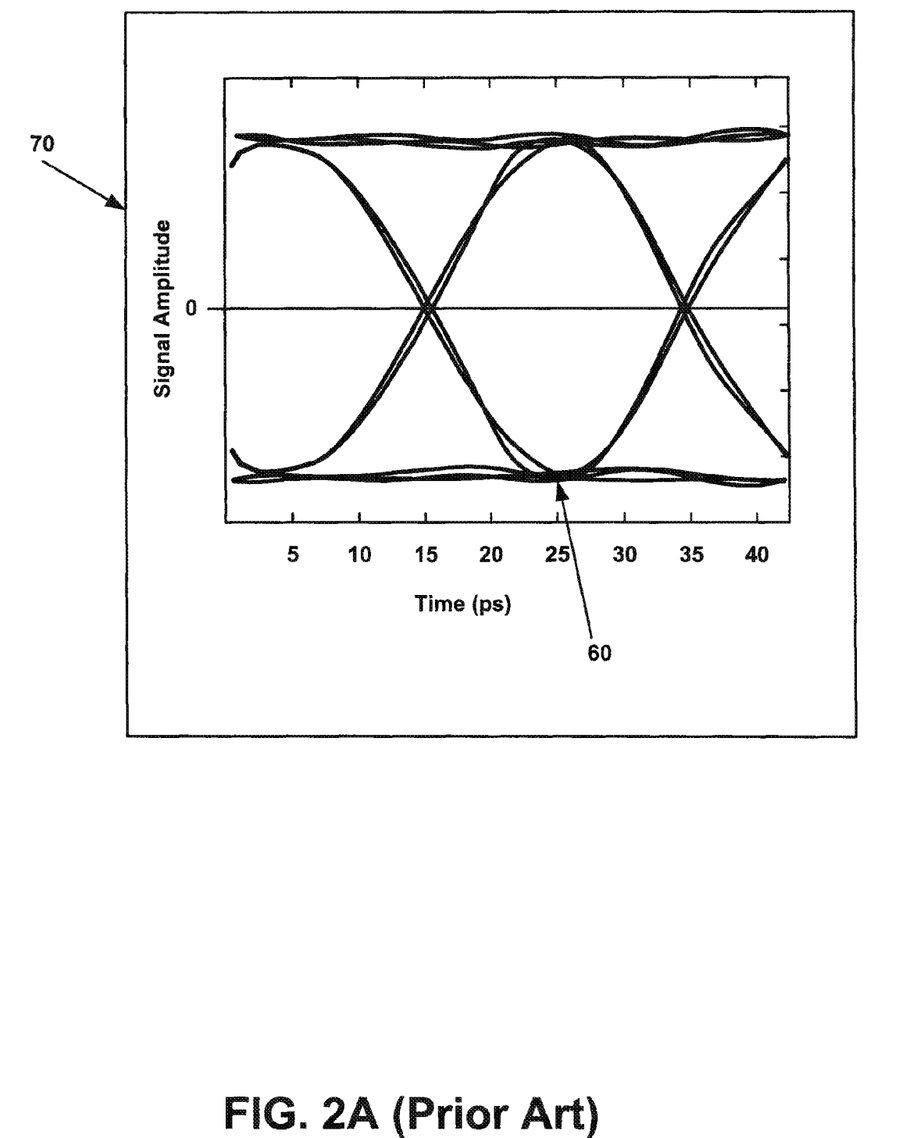
FIGS. 2a and b illustrate examples of eye patterns.
Figure 2B:
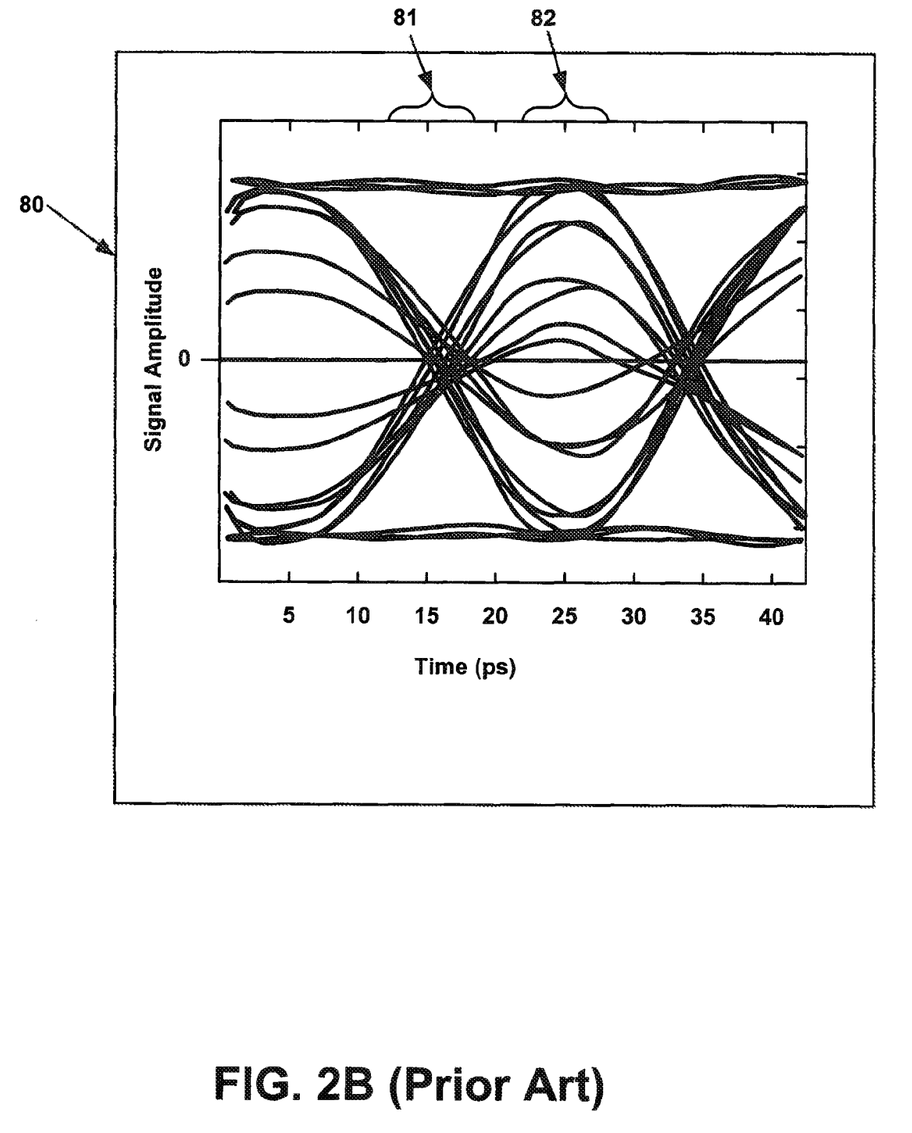

Equalizers based on transversal filters have been promoted as a way of removing noise and inter-symbol interference in some systems. For example, FIG. 1 (prior art) illustrates an example of a proposed transversal filter based equalizer 10 controlled by a microprocessor 50. In this example, the coefficients for the transversal filter may be set by the adaptation logic module, a microprocessor 50, based on analysis of eye monitor 30 data. However, this design requires the use of a clock 40 for the purpose of synchronizing data sampling. This type of design may fail in cases of severe distortion such as inter-symbol interference. For example, FIGS. 2a and b illustrate examples of eye patterns. For example, a typical eye monitor may sample in or near the "center" 60 of an eye pattern 70. However, systems experiencing severe interference may exhibit a "closed" eye pattern, 80. Typical eye monitors may fail in this situation.

Accordingly, it is desirable to have some method and device for high-speed adaptive equalization that may operate effectively even for systems experiencing severe distortion such as inter-symbol interference.

SUMMARY OF THE INVENTION

It is an object of the current invention to provide a method and apparatus for improved high-speed adaptive equalization that may operate effectively even in systems experiencing severe interference. By using one or more error generators and taking multiple samples across a bit interval, a preferred embodiment of the current invention may operate effectively when analyzing signals with severe interference. Advantageously, a preferred embodiment of the current invention may be deployed in a clockless configuration.

Optionally, one or more filter types may be used singly or in combination. Examples of filters that may be used include, but are not limited to: transversal filters, lattice filters, linear and/or non-linear filters. Preferably, the filters may be controlled by one or more microprocessors. Preferably, the microprocessors may be used to assess the error data from the error generators and to calculate the appropriate coefficients for the filters according to one or more algorithms. Preferably, the steps of sampling, assessment, calculation and coefficient setting may be done iteratively to converge to an optimum set of filter values. Iterative operation may also be used to respond dynamically to signals with time-varying noise and interference characteristics.

Optionally, one or more algorithms may be used to analyze the error data. For example, in some cases, a first algorithm may be used to assess error data and calculate a set of filter coefficients to provide an initial set of coefficients. The initial set of coefficients may be used to identify a coarse solution for alternate algorithms to use as a starting point. This enables the use of a wide variety of minimization algorithms to provide fine equalization even when multiple local minima exist. Typically, multi-dimensional minimization algorithms may be used.

Advantageously, the current invention may be used to address the types of time-varying noise and interference typical of common, high-speed optical communication systems.

DETAILED DESCRIPTION OF PREFERRED EMBODIMENTS

Figure 3:
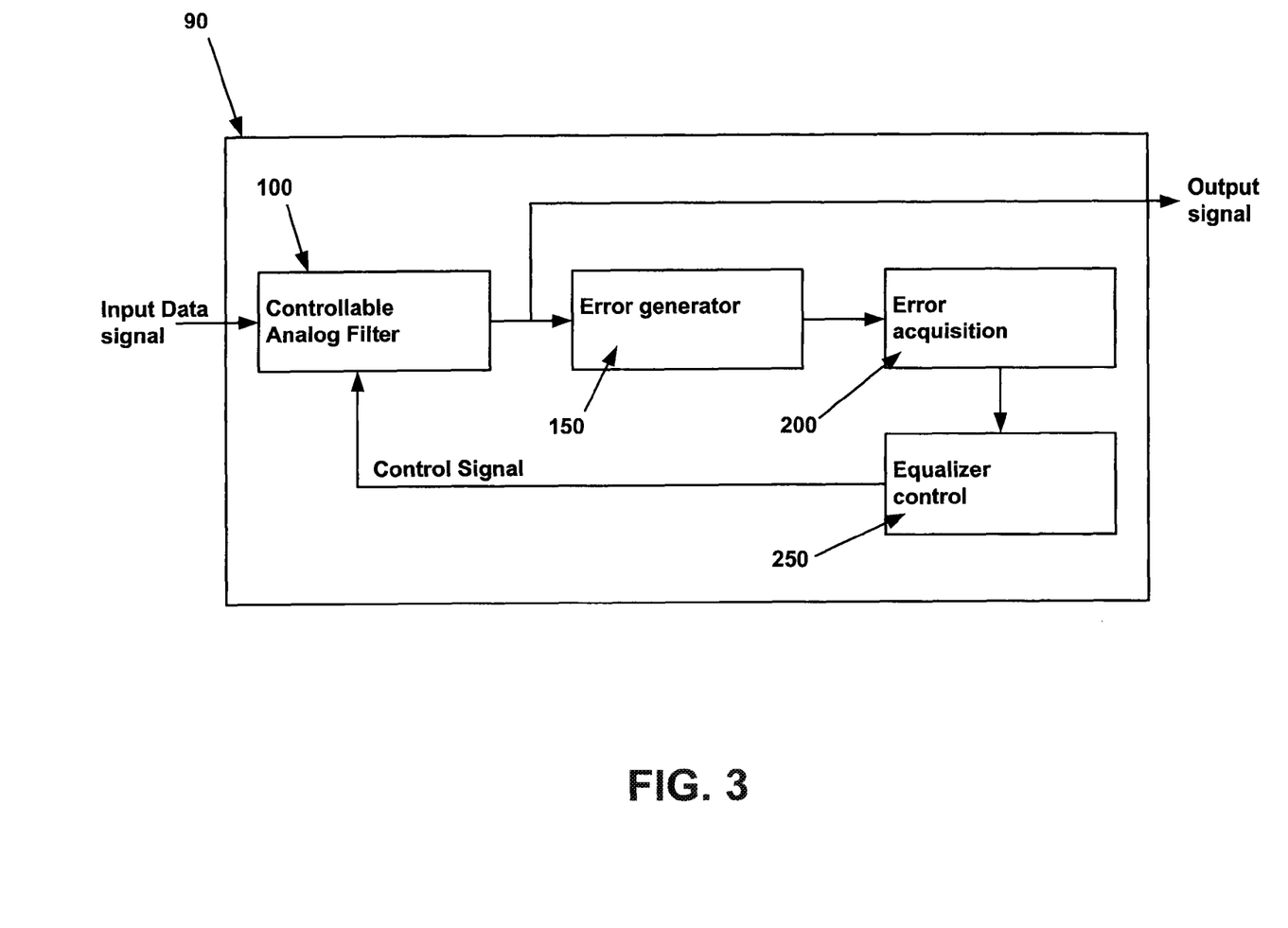
FIG. 3 illustrates a preferred embodiment of the current invention.
Figure 4:
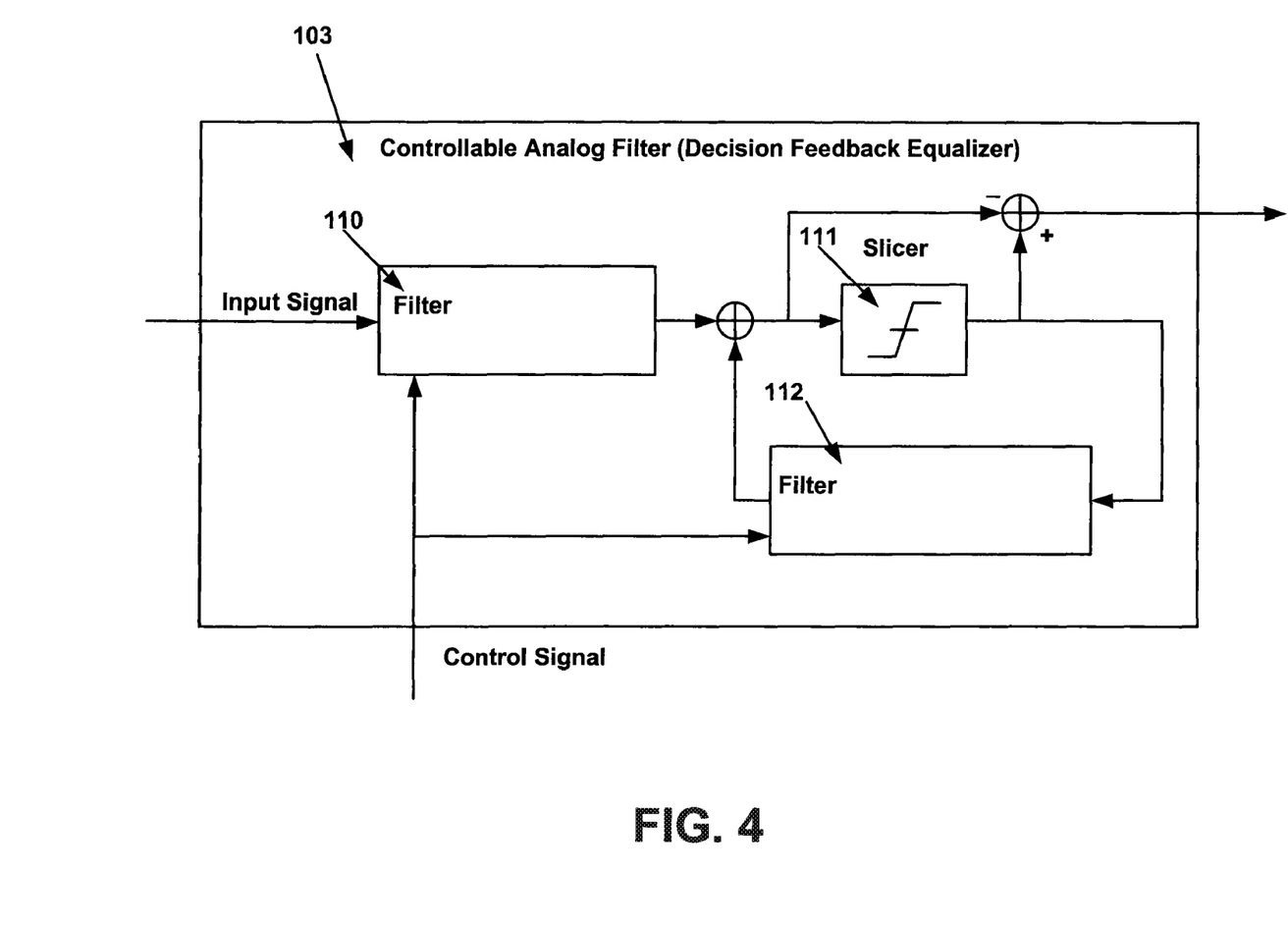
FIG. 4 illustrates an example of a controllable analog filter comprising two filters implemented in a decision feedback equalizer (DFE) configuration according to an alternate embodiment of the current invention.
Figure 5:
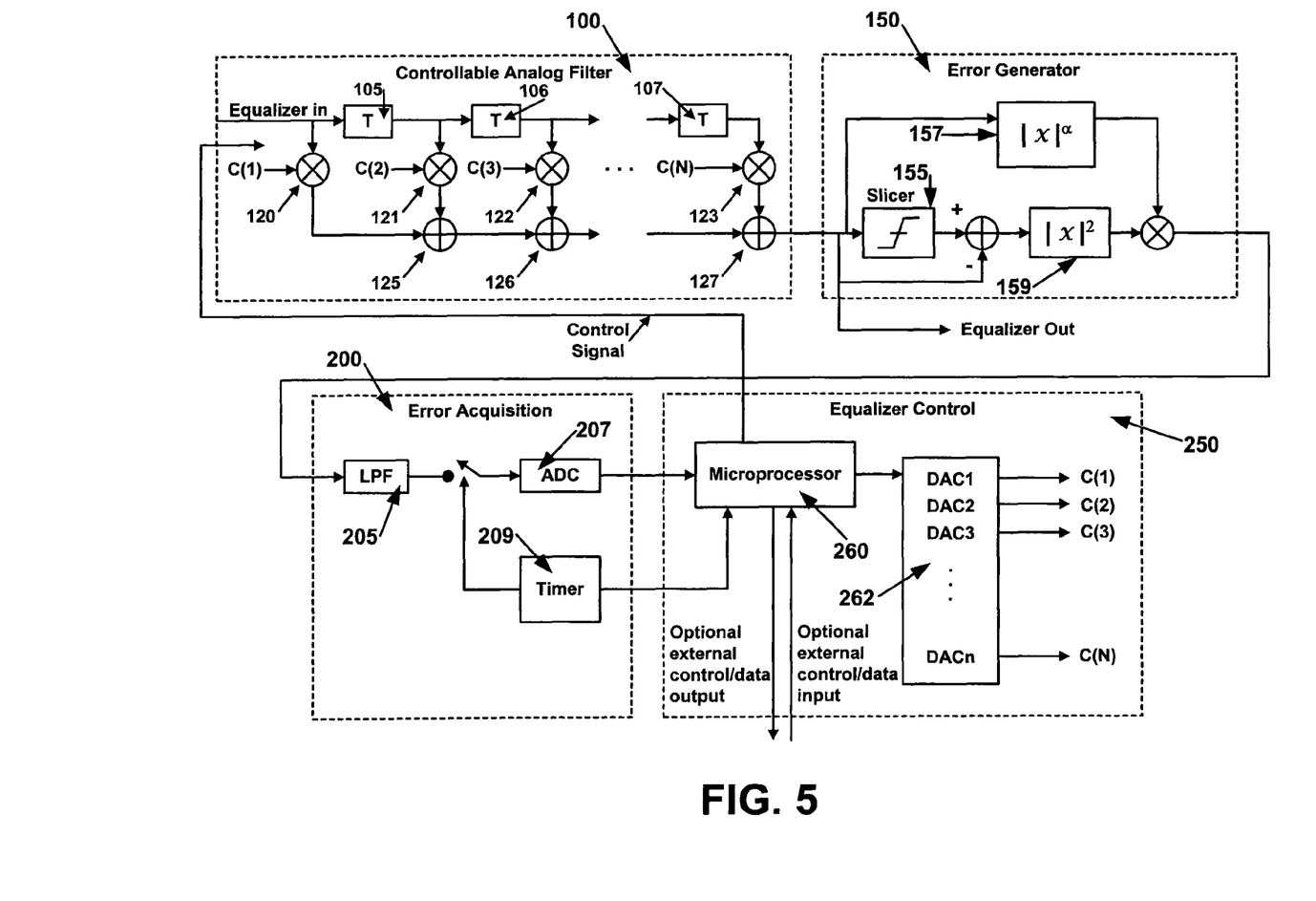
FIG. 5 illustrates a detailed view of a preferred embodiment of the current invention.

FIG. 3 illustrates a preferred embodiment of the current invention 90. According to a preferred embodiment of the current invention, one or more data signals may be received by the controllable analog filter 100. Typically, the data signals may be analog, digital and/or sampled analog signals. Preferably, the one or more controllable analog filters serve to filter out noise and compensate for channel impairment or imperfections such as inter-symbol interference (ISI). In this example, a single controllable analog filter 100 is used. However, according to alternate embodiments of the current invention, one or more controllable analog filters may be used in various configurations. Furthermore, in some cases, a single controllable analog filter may comprise two or more filters. For example, FIG. 4 illustrates an example of a controllable analog filter 103 comprising two filters 110 and 112 implemented in a decision feedback equalizer (DFE) configuration according to an alternate embodiment of the current invention. FIG. 5 illustrates a detailed view of a preferred embodiment of the current invention. In this example, controllable analog filter 100 is implemented as a transversal filter using a set of N analog delay lines 105, 106 and 107, a set of multipliers 120, 121, 122, 123, and a set of adders 125, 126, and 127 to provide a weighted sum of delayed versions of the input signal or signals. In this example, N analog delay lines are illustrated. However, according to alternate embodiments of the current invention, transversal filters with one or more analog delay lines may be used. Typically, analog delay lines used in a transversal filter such as 105, 106 and 107 will have similar, but not identical delays. However, according to various embodiments of the current invention, the delays associated with analog delay lines 105, 106 and 107 may or may not vary widely. Referring to FIG. 5, in this example, coefficients are used as input to multipliers 120, 121, 122 and 123 for the purpose of controlling the controllable analog filter 100. According to a preferred embodiment of the current invention, the initial coefficients may be set to a "pass-through" value allowing the input signal or signals to traverse the controllable analog filter unchanged for assessment by the error generator 150. Preferably, new coefficient values may then be calculated based on the initial signal. However, according to alternate embodiments of the current invention, the initial coefficients may be set to a previously configured value or received from an external source. Alternately, the initial coefficients may be set to a previously stored value. For example, the coefficients may be initialized based on coefficient values calculated or used in prior operation of the controllable analog filter.

Figure 6:
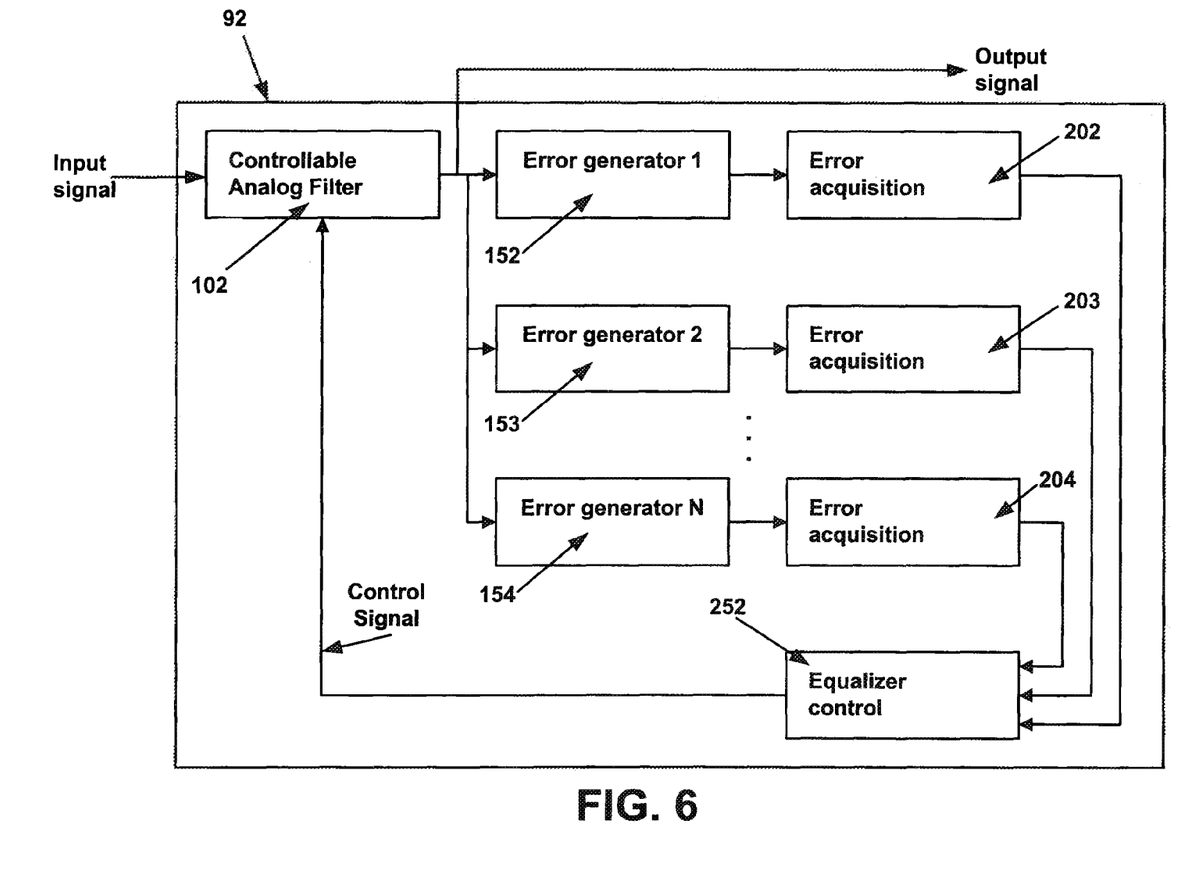
FIG. 6 illustrates an alternate embodiment of the current invention.

According to a preferred embodiment of the current invention, one or more processed signals may be output by the controllable analog filter or filters. Preferably, the output signal may be provided as input to one or more error generators as well as output from the adaptive equalizer. Referring to FIG. 3, the output of controllable analog filter 100 is routed to error generator 150 and provided as output from the adaptive equalizer 90. However, according to alternate embodiments of the current invention, the output of controllable analog filter 100 may be further processed before it is provided as output from the adaptive equalizer device. For example, in some cases, a slicer, such as slicer 155, may process the output of the controllable analog filter before it is provided as output from the adaptive equalizer device. FIG. 6 illustrates an alternate embodiment 92 of the current invention. In this example, equalizer 92 comprises three error generators 152, 153 and 154. According to alternate embodiments of the current invention, the use of two or more error functions may be used in conjunction with one or more equalizer control algorithms to enable the effective use of error functions with numerous local minima. In some cases, applying a minimization algorithm to the output of an error function with numerous local minima may prevent the minimization algorithm from converging properly to the appropriate minimum if the controllable analog filter is started with wrong initial coefficient values. To address this issue, a coarse equalization may be performed with a first error function and minimization algorithm for the purpose of roughly setting the initial coefficient values such that the equalizer may operate in a regime where a second, finer error function may be used. According to alternate embodiments of the current invention, one or more of the error generators may comprise an eye monitor. Referring to FIG. 5, a detailed embodiment of a preferred implementation of error generator 150 illustrates an example of an error function 159 that may be used. In this example, the absolute value of the difference between slicer 155 input and slicer 155 output is squared and assessed as the error minimization function 159. Preferably, the signal data may be massaged by applying one or more functions to the signal before the error function is applied. For example, depending on the nature of the input signal, it may be advantageous to apply a level shift and/or normalization function to the signal data such that the intensity values corresponding to a "low" signal are adjusted to reflect a negative intensity while intensity values corresponding to a "high" signal are adjusted to reflect a positive intensity. According to alternate embodiments of the current invention, alternate error functions may be implemented. For typical prior art, a clock and or clock recovery circuit may be used in conjunction with a typical eye monitor for assessing a single point on a bit interval. However, according to the current invention, typically, two or more points may be assessed using one or more error functions across a bit interval and the use of a clock and/or clock recovery circuit is not required. Optionally, a weighting function 157 may be used to create a weighted error function. For example, considering the eye pattern of an incoming signal, a time-weighted error function may be useful for de-emphasizing the error signal corresponding to the error signal near the zero crossings of the "eye" in an eye pattern and emphasizing the error signal near the middle of the "eye". Referring to eye pattern 80 in FIG. 2b, region 81 corresponds to a zero crossing of the "eye" and region 82 corresponds to the middle of the "eye". According to a preferred embodiment of the current invention, the weighting function may be provided with a processed signal, such as the output of the controllable analog filter. For example, raising the absolute value of a processed signal to a power may be used as a weighting function to emphasize the error signal near the middle of the "eye" and de-emphasize the error signal near the zero crossings of the "eye" without requiring the use of a clock. However, in alternate embodiments according to the current invention the weighting function may use other input such as input from a clock instead of or in addition to processed or unprocessed signal data as input. In this case, a clock or clock recovery system may be internal to or external to the current invention.

Preferably, the error generator output signal is further processed before it is provided to one or more equalizer controllers. Preferably, the error generator output signal is provided to one or more error acquisition blocks for filtering according to one or more acquisition filters. Typically, an acquisition filter may comprise one or more anti-aliasing filters, noise reduction filters, low pass filters and/or integrators. Preferably, the frequency characteristics of the signal may be altered. Preferably, the error acquisition block samples the signal so that it may be provided to an equalizer controller at a rate consistent with the operation of that equalizer controller. Referring to FIG. 5, a low pass filter (LPF) 205 is used to execute an averaging operation on incoming data from the error generator according to a preferred embodiment of the current invention. Typically, this serves to prevent aliasing and reduces noise in the incoming data signal. According to alternate embodiments of the current invention, an integrator may be used in addition to or instead of one or more LPFs. According to an alternate embodiment of the current invention, two or more error acquisition modules 202, 203, 204 may be implemented as illustrated in FIG. 6. Referring again to FIG. 5, preferably, an analog to digital converter (ADC) 207 may be used prepare the processed signal for output to the equalizer control module. Typically, an equalizer control module 250 may be used to control the sampling rate or data acquisition intervals. Optional timer 209 may be used to control acquisition intervals for sampling at a constant rate. Alternately, the sampling rate and/or data acquisition interval may not be controlled by the equalizer control module 250. Typically, in this case, the equalizer control module 250 may discard unwanted or unprocessable data.

According to a preferred embodiment of the current invention, the high-speed adaptive equalizer device may operate iteratively. The word iteratively, as applied to the operation of the current invention, is contemplated to include repeating one or more steps as part of the process of converging to a new or optimized set of filter values. Alternately, one or more steps may be repeated as part of the process of responding dynamically to signals with time-varying noise and interference characteristics. For example, the steps of data sampling, data filtering, error assessment, error acquisition, error function application, minimization algorithm application, weighting function application, coefficient calculation and/or coefficient setting may be done iteratively.

Preferably, one or more equalizer control modules may receive processed signals from one or more error acquisition modules. FIG. 6 illustrates an alternate embodiment of the current invention wherein a single equalizer control module 252 receives processed data signals from error acquisition modules 202, 203 and 204. FIG. 5 illustrates a preferred embodiment of the current invention wherein a single equalizer control module 250 receives processed data signals from error acquisition module 200. Typically, the equalizer controller receives processed data signals and controls one or more controllable analog filters based on one or more minimization algorithms for minimizing the error signal such as quasi-Newton or steepest descent algorithms. Typically, an equalizer controller may control a controllable analog filter by changing the coefficients used by the controllable analog filter. Advantageously, according to a preferred embodiment of the current invention, any mismatch in controllable analog filter delay line segments may be assessed using the error function implemented in the error generator and compensated for by the minimization algorithm. Preferably, the controllable analog filter may be controlled using analog control signals and the equalizer controller may comprise a microprocessor capable of generating digital control signals. In this case, the digital control signals must be converted to analog signals in order to control the controllable analog filter. Preferably, a digital to analog converter (DAC) 262 may exist in an equalizer control module 250 as illustrated in FIG. 5. Alternately, one or more DACs may exist in other regions of the current invention. For example, a controllable analog filter may accept digital control signals and perform the digital to analog conversion within the controllable analog filter.

Preferably, the equalizer control module 200 may be implemented as one or more microprocessors 260. However, alternate embodiments according to the current invention may be implemented using custom hardware, software and/or firmware. According to a preferred embodiment of the current invention, excess capacity in the microprocessor 260 or alternate hardware, software and/or firmware may be used for a variety of purposes. For example, excess memory and/or storage capacity may be used to store equalizer performance history and/or device status data. Using excess processing power of the microprocessor 260 and/or alternate hardware, software and/or firmware, equalizer performance, capacity and/or device status may be assessed. For example, by monitoring the equalizer performance and/or settings, it may be possible for the microprocessor to determine if the equalizer is operating near, at or beyond its operating limit. Typically, equalizers have operating limits. In some cases, a preferred embodiment of the current invention may be installed and operate properly shortly after installation, but may operate beyond its operating limits a short time later due to serious degradation of input channel characteristics. Furthermore, once it has been determined that some element of the current invention is operating near, at or beyond its operating limits, it may be possible to provide notification of this device status or to take some automated, proactive action. Furthermore, an inline, non-invasive link monitor may be implemented according to an alternate embodiment of the current invention. For example, the quality of an optical link may be estimated by assessing the controllable analog filter coefficients and estimating the differential group delay caused by polarization mode dispersion by computing the frequency response of the controllable analog filter. Typically, polarization mode dispersion is a time-varying phenomenon. In some cases, historical data may be stored and a history of link quality statistics may be maintained. Preferably, configurations and/or algorithms may be managed using the control processor, hardware, firmware and/or software. Examples of management tasks may include: adding, reconfiguring, updating, upgrading, deploying, deleting and/or decommissioning configurations, control algorithms, and/or error functions. Furthermore, according to an alternate embodiment of the current invention, the control processor, hardware, firmware and/or software may be used for joint optimization of the filter coefficients with device parameters for devices internal to and/or external to the current invention. For example, a processor may be used to adjust or provide data for the adjustment of the gain parameters of a receiver in combination with adjusting controllable analog filter coefficient values. Similarly, provisions may be made to assess, control and/or compensate for chromatic dispersion effects and/or a variety of transponder features such as sampling phase, decision threshold levels, and DC offset levels. Optional control/data input and control/data output interfaces may be used to enable the transfer of control signals and/or data, into and/or out of an alternate embodiment of the current invention.

According to an alternate embodiment of the current invention, some elements of the current invention may be used in one or more modules. For example, referring to FIG. 5, ADC 207 may be used to convert analog signals from LPF 205 into digital signals that may be provided to equalizer control module 250. However, according to an alternate embodiment of the current invention comprising two or more error acquisition modules, a single ADC may be used to provide analog to digital conversion for more than one LPF and/or integrator. Similarly, according to an alternate embodiment of the current invention wherein one or more controllable analog filters comprise one or more DFE filters 103 as illustrated in FIG. 4, the same slicer may be used in both the DFE and one or more error generators.

Figure 7A:
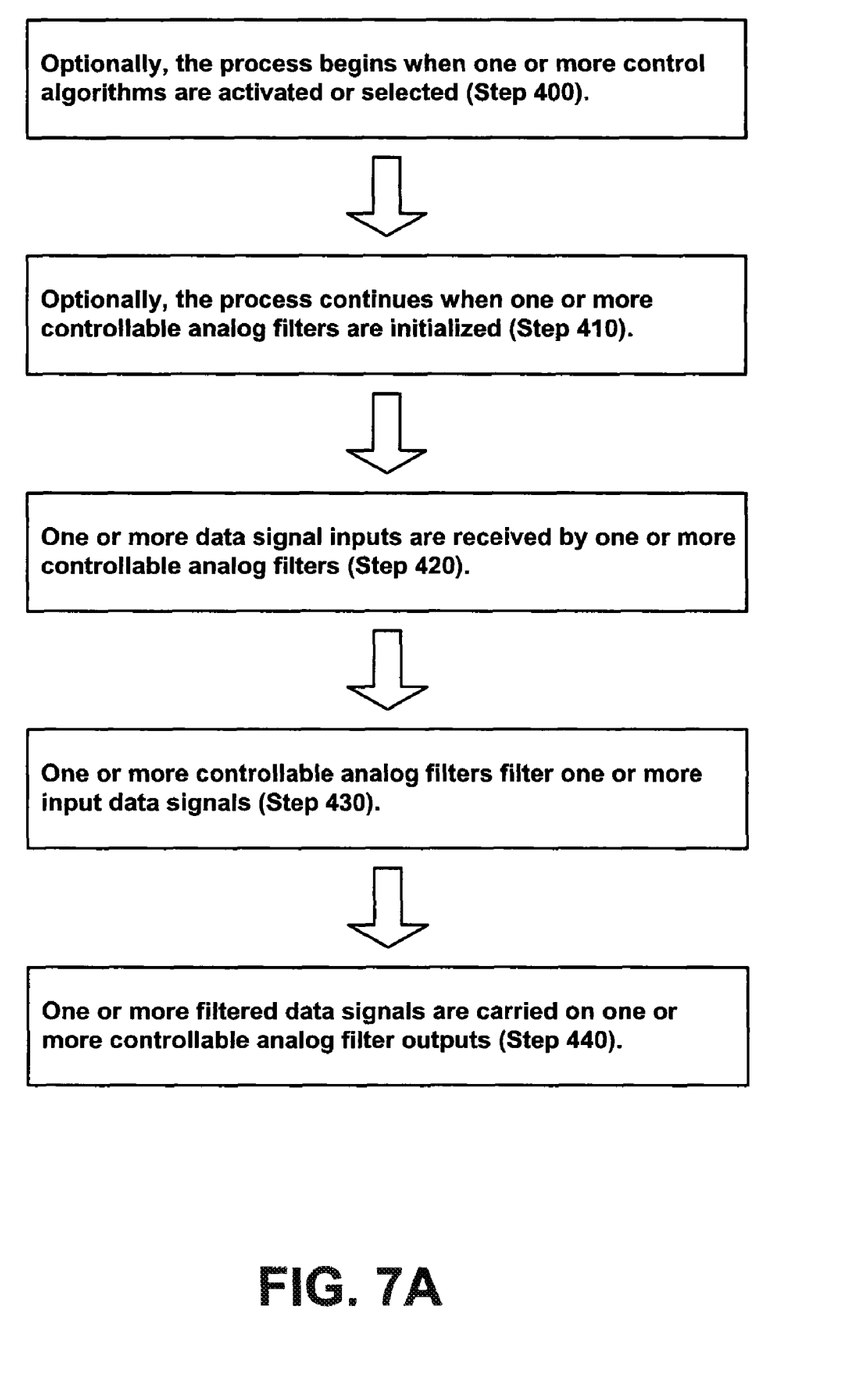
FIGS. 7a, b and c illustrate a process for improved high-speed adaptive equalization according to the current invention.
Figure 7B:
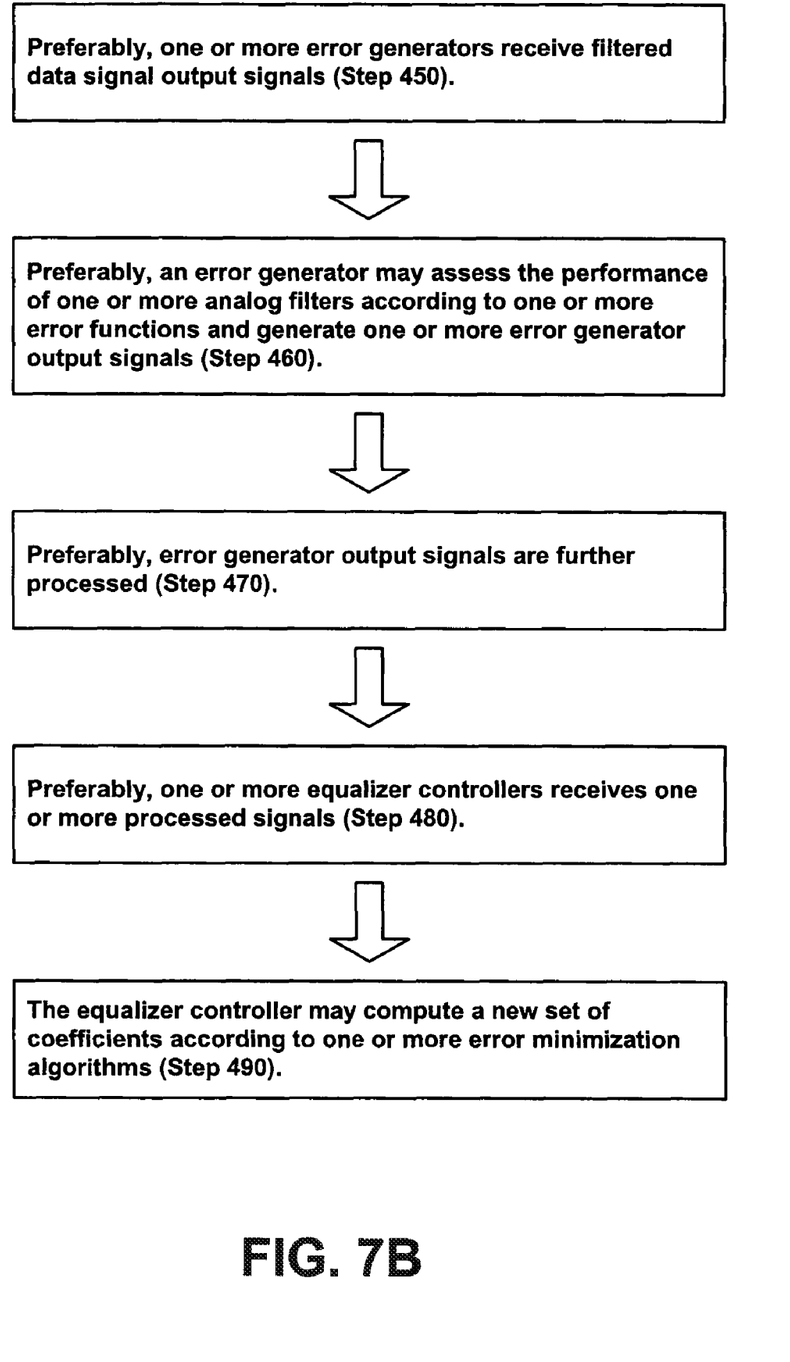
Figure 7C:
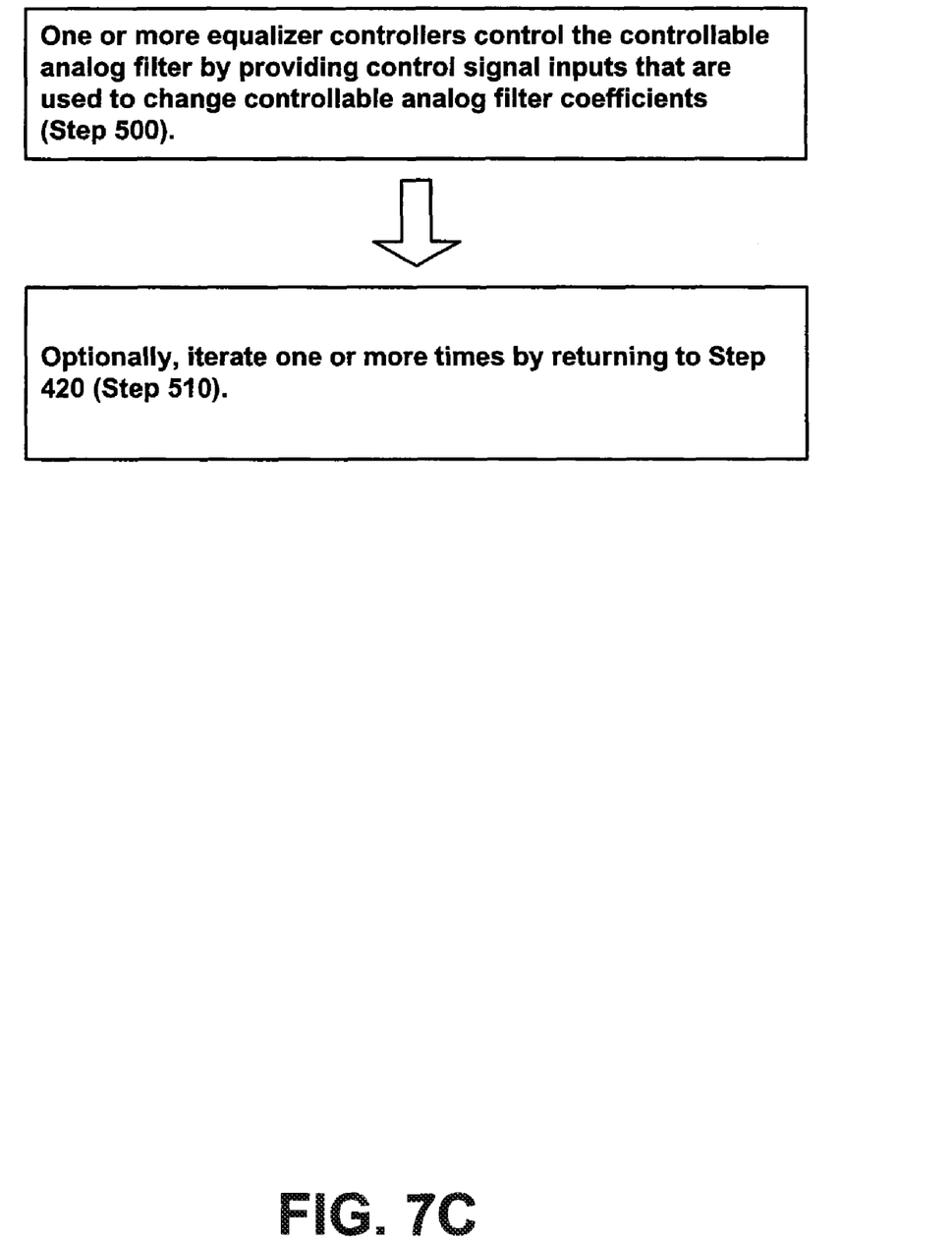

FIGS. 7a, b and c illustrate a process for improved high-speed adaptive equalization according to the current invention. Optionally, the process begins when one or more control algorithms are activated or selected (Step 400). Preferably, one or more of the algorithms comprise minimization algorithms that may be used for minimizing error signals such as quasi-Newton or steepest descent algorithms. Alternately, one or more control algorithms may be pre-configured. Optionally, the process continues when one or more controllable analog filters are initialized (Step 410). Typically, the step of initialization comprises setting the initial filter coefficients for one or more of the controllable analog filters. Preferably, the filter coefficients may be set to a "pass-through"

mode such that an incoming signal may pass through the filter unchanged. However, in some cases, initial filter coefficients may be set based on external input, calculation and/or previously stored values. The process continues when one or more data signal inputs are received by one or more controllable analog filters (Step 420). Typically, the data signals may comprise high-speed signals such as, but not limited to, signals obtained from high-speed lightwave systems. In some cases, the signals may comprise analog, digital and/or sampled analog signals. The process continues when one or more controllable analog filters filter one or more input data signals (Step 430). Preferably, the step of filtering comprises filtering noise and/or compensating for channel impairment and/or imperfections such as inter-symbol interference. Preferably, a filter is controlled wholly or in part according to signals from one or more equalizer controllers. Typically, an equalizer controller may control a controllable analog filter by setting or adjusting one or more of the filter coefficients that may be used by the filter in providing a weighted sum of a delayed version of the input signal. The process continues when one or more filtered data signals are carried on one or more controllable analog filter outputs (Step 440). Preferably, one or more controllable analog filter outputs provide a filtered data signal output signal to one or more internal components of the current invention. Preferably, one or more controllable analog filter outputs provide a filtered data signal output signal to one or more components external to the current invention. However, signals may be further processed before they are provided to one or more external components in an alternate method according to the current invention. For example, in some cases, the filtered data signal output signal may be subject to a slicer operation before it is provided to external components. Preferably, the process continues when one or more error generators receive filtered data signal output signals (Step 450). Preferably, an error generator may assess the performance of one or more analog filters according to one or more error functions and generate one or more error generator output signals (Step 460). In some cases, filtered data signal output signals may be massaged before an error function is applied. For example, in some cases, it may be advantageous to apply a level shift and/or normalization function before the application of an error function. In some cases, a weighting function may be applied to the error generator signals before the error generator signals are provided as output. For example, a weighting function such as $w(t)=|\chi|^\alpha$ may be used to emphasize the error signal near the center of an "eye pattern" and de-emphasize the error signal near the zero crossings of an "eye pattern" without requiring the use of a clock. However, alternate examples of weighting functions may use data from a variety of sources such as internal or external clock modules to provide weighting. Typically, a large error signal generated by an error generator may indicate a poorly performing and/or incorrectly configured high-speed adaptive equalizer device whereas a small error signal may indicate a properly configured high-speed adaptive equalizer device. Preferably, the process continues when the error generator output signals are further processed (Step 470). Preferably, one or more error acquisition modules receives and processes one or more error generator output signals. Preferably, the error acquisition module applies one or more acquisition filters to the error generator output signals. For example, the error generator output signals may be processed by one or more anti-aliasing filters, noise reduction filters, low pass filters and/or integrators. Typically, an error acquisition module may sample the error generator output signals at a rate consistent with the operating speed of an equalizer controller. Preferably, the error generator output signals may be averaged with one or more low pass filters and/or integrators. Typically, the output of an error acquisition module may be digitized using an analog to digital converter so that digital error signal output may be provided. Optionally, timing input may be provided from an error acquisition module to one or more equalizer controllers for the purpose of enabling the management, monitoring and/or control of sampling rates and/or data acquisition intervals. Preferably, the process continues when one or more equalizer controllers receives one or more processed signals (Step 480). Preferably, the processed signals comprise error generator output signals processed by an error acquisition module. The equalizer controller may compute a new set of coefficients according to one or more error minimization algorithms (Step 490). One or more equalizer controllers control a controllable analog filter by providing control signal inputs that are used to change the controllable analog filter coefficients (Step 500). In some cases, the control signal inputs may comprise digital signals. Alternately, the control signal inputs may comprise analog signals. In the case where one or more digital control signal inputs are received by the controllable analog filter, the controllable analog filter may convert some or all of the incoming digital control signal inputs to analog signals. Optionally, iterate one or more times by returning to Step 420 (Step 510).

Figure 8A:
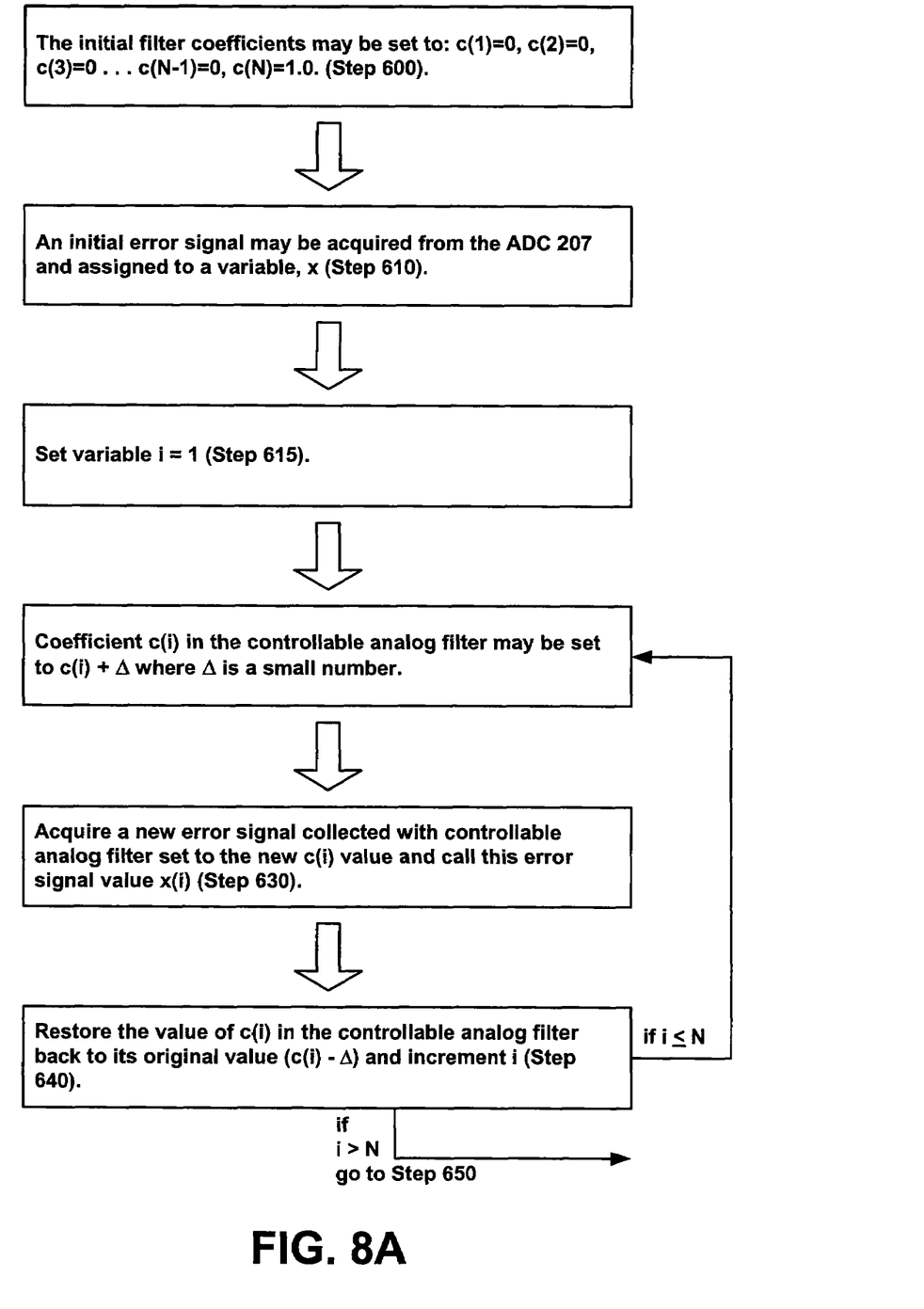
FIGS. 8a and b illustrate a detailed example of adjusting the controllable analog filter coefficients to minimize the error signal according to a steepest descent algorithm in a preferred embodiment of the current invention.
Figure 8B:
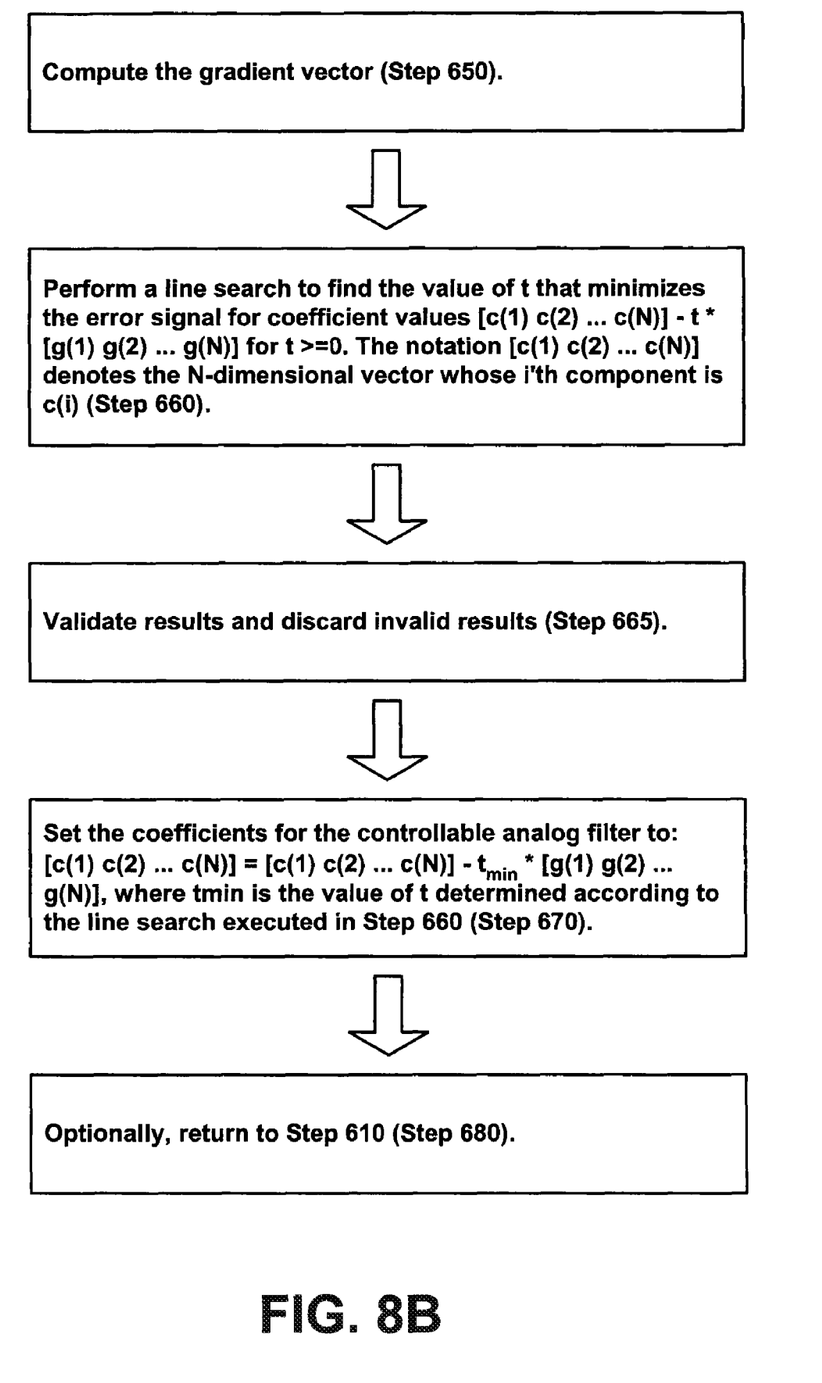

FIGS. 8a and b illustrate a detailed example of adjusting the controllable analog filter coefficients to minimize the error signal according to a steepest descent algorithm in a preferred embodiment of the current invention. This example is intended to help illustrate a preferred mode of operation. A variety of alternate modes are possible. For example, a variety of mathematical techniques for minimizing a multivariate function may be used according to the current invention. The following example is meant to represent only one of many possible approaches for adjusting the controllable analog filter coefficients for a preferred embodiment of the current invention. For this example, consider the digital to analog converter (DAC) 262 illustrated in FIG. 5 may generate $2^D$ values that are uniformly spaced across a range. Alternate embodiments according to the current invention may use one or more different DACs such as, but not limited to, DACs providing values with non-uniform spacing and/or with differing ranges. For this example, the controllable analog filter 100 may be initialized by the equalizer controller 250 by using the DAC 262 to set the filter coefficients. In this example, the initial filter coefficients may be set to: $c(1)=0$, $c(2)=0, c(3)=0 \ldots c(N-1)=0, c(N)=1.0$ (Step 600). Steps 610, 615, 620, 630, 640, and 650 illustrate how an estimate of the gradient of the error signal may be made. An initial error signal may be acquired from the ADC 207 and assigned to a variable, x (Step 610). Set variable i=1 (Step 615). Coefficient c(i) in the controllable analog filter may be set to $c(i)+\Delta$ where $\Delta$ is a small number (Step 620). For this example, $\Delta$=the smallest positive value representably by DAC 262 may be chosen. However, alternate selections for the value of $\Delta$ may be used. In some cases, a slightly larger $\Delta$ may be used. Alternately, the value of $\Delta$ may be variable. In alternate cases, the value of $\Delta$ may be determined by holding the value of $\Delta/x(i)$ roughly constant. Acquire a new error signal collected with controllable analog filter set to the new c(i) value and call this error signal value x(i) (Step 630). Restore the value of c(i) in the controllable analog filter back to its original value ($c(i)-\Delta$) and increment i (Step 640). Repeat steps 620, 630 and 640 for i=2 to N where N is the number of filter coefficients considered, producing $x(1), x(2) \ldots x(N)$. Compute the gradient vector (Step 650). For example, the gradient vector may be represented as: $g(i)=(x(i)-x)/\Delta$ for $i=1, 2, \ldots N$. A variety of techniques may be used to calculate the gradient vector such as a backward difference technique or a centered difference technique. Perform a line search to find the value of t that minimizes the error signal for coefficient values $[c(1) c(2) \ldots c(N)]-t*[g(1) g(2) \ldots g(N)]$ for $t >= 0$ (Step 660). For this example, the notation $[c(1) c(2) \ldots c(N)]$ is used to denote an N-dimensional vector whose i'th component is c(i). For this example, the line search may be performed using Brent's method as described on pages 400-405 of Numerical Recipes in C, second edition, Cambridge University Press 1997, which we hereby incorporate by reference. However, alternate methods for performing a line search may be used. In some cases, the type of line search used may depend on the type of minimization technique used. Validate results and discard invalid results (Step 665). For example, in some cases, the line search may fail due to noise in the measured error value. For example, if the error value corresponding to the coefficient vector for tmin is not less than the measured error value for the original coefficient vector (t=0), the results may be considered suspect and should be discarded. For validated results, set the coefficients for the controllable analog filter to:

$$[c(1)c(2) \ldots c(N)]=[c(1)c(2) \ldots c(N)]-tmin*[g(2) \ldots g(N)]$$

where tmin is the value of t determined according to the line search executed in Step 660 (Step 670). Optionally, return to Step 610 (Step 680). In this case, iteration is may be used to converge to an optimum set of filter values. Iterative operation may also be used to respond dynamically to signals with time-varying noise and interference characteristics.

The foregoing described embodiments of the invention are provided as illustrations and descriptions. They are not intended to limit the invention to the precise form described. For example, although a steepest descent minimization technique is used to illustrate the operation of the current invention, a wide variety of minimization techniques may be used instead of or in addition to the steepest descent technique. In particular, the Applicants contemplate that functional implementation of the invention described herein may be implemented equivalently in hardware, software, firmware, or other available functional components or building blocks. Also, the process steps describing the methods may be re-arranged and/or re-ordered. Other variations and embodiments are possible in light of above teachings, and it is thus intended that the scope of invention not be limited by this Detailed Description, but rather by Claims following.

We claim:

1. An improved high-speed adaptive equalizer device comprising:
   one or more controllable analog filters comprising:
      one or more data signal inputs for receiving one or more data signals;
      one or more control signal inputs for receiving one or more control signals; and
      one or more outputs for carrying filtered data signal output signals; and
   one or more error generators for assessing the performance of one or more of said controllable analog filters according to one or more error functions coupled to one or more of said analog filters comprising:
      one or more inputs for receiving one or more of said filtered data signal output signals from said controllable analog filter;
      one or more outputs for carrying error generator output data signals; and
      one or more processing modules for processing said error generator output data signals creating processed data signals;
   wherein one or more of said processing modules comprise one or more error acquisition blocks for applying one or more acquisition filters to one or more of said error generator output data signals thereby creating one or more processed signals coupled to one or more of said error generators comprising:
      one or more inputs for receiving said error generator output data signals; and
      one or more outputs for carrying processed data signals.

2. The improved high-speed adaptive equalizer device of claim 1 wherein one or more of said acquisition filters comprise an anti-aliasing filter, a noise reduction filter, a low pass filter or an integrator.

3. The improved high-speed adaptive equalizer device of claim 1 wherein one or more of said algorithms comprise a quasi-Newton, steepest descent or multivariate minimization algorithm.

4. A method for improved high-speed adaptive equalization comprising:
   receiving one or more data inputs at one or more controllable analog filters;
   filtering said one or more data inputs according to filter coefficients to create one or more filtered data signals;
   receiving said filtered data signals at one or more error generators;
   assessing the performance of one or more of said controllable analog filters according to one or more error functions creating one or more error generator output data signals; and
   processing said error generator output signals creating processed data signals;
   wherein processing said error generator output signals comprises:
      receiving said error generator output data signals at an error acquisition module; and
      filtering said error generator output data signals according to one or more acquisition filters.

5. A system for improved optical networking comprising:
   an improved high-speed adaptive equalizer device coupled to an optical network comprising:
      one or more controllable analog filters comprising:
         one or more data signal inputs for receiving one or more data signals;
         one or more control signal inputs for receiving one or more control signals; and
         one or more outputs for carrying filtered data signal output signals; and
      one or more error generators for assessing the performance of one or more of said controllable analog filters according to one or more error functions coupled to one or more of said analog filters comprising:
         one or more inputs for receiving one or more of said filtered data signal output signals from said controllable analog filter;
         one or more outputs for carrying error generator output data signals; and
         one or more processing modules for processing said error generator output data signals creating processed data signals;
      wherein one or more of said processing modules comprise one or more error acquisition blocks for applying one or more acquisition filters to one or more of said error generator output data signals thereby creating one or more processed signals coupled to one or more of said error generators comprising:

one or more inputs for receiving said error generator output data signals; and one or more outputs for carrying processed data signals.

6. The improved high-speed adaptive equalizer device of claim 5 wherein one or more of said acquisition filters comprise an anti-aliasing filter, a noise reduction filter, a low pass filter or an integrator.

* * * * *

UNITED STATES PATENT AND TRADEMARK OFFICE
CERTIFICATE OF CORRECTION

| | |
|---|---|
| PATENT NO. | : 7,738,547 B2 |
| APPLICATION NO. | : 11/943569 |
| DATED | : June 15, 2010 |
| INVENTOR(S) | : Wang et al. |

It is certified that error appears in the above-identified patent and that said Letters Patent is hereby corrected as shown below:

In column 9, lines 23-24, delete "[g(2)...g(N)]" and insert --[g(1) g(2)...g(N)--, therefor.

In column 9, line 27, delete "iteration is" and insert --iteration--, therefor.

Signed and Sealed this
Fourth Day of January, 2011

David J. Kappos
*Director of the United States Patent and Trademark Office*